(12) United States Patent
Colella et al.

(10) Patent No.: US 12,395,769 B2
(45) Date of Patent: Aug. 19, 2025

(54) OLT POWER MANAGEMENT SYSTEM

(71) Applicant: ARRIS Enterprises LLC, Suwanee, GA (US)

(72) Inventors: Barry D. Colella, Newburyport, MA (US); David Bowler, Stow, MA (US); Erik J. Gronvall, Bloomington, MN (US)

(73) Assignee: ARRIS Enterprises LLC, Suwanee, GA (US)

( * ) Notice: Subject to any disclaimer, the term of this patent is extended or adjusted under 35 U.S.C. 154(b) by 250 days.

(21) Appl. No.: 18/143,008

(22) Filed: May 3, 2023

(65) Prior Publication Data

US 2023/0362521 A1 Nov. 9, 2023

Related U.S. Application Data

(60) Provisional application No. 63/338,414, filed on May 4, 2022.

(51) Int. Cl.
| | |
|---|---|
| *H04Q 11/00* | (2006.01) |
| *H04B 10/27* | (2013.01) |
| *H04L 12/28* | (2006.01) |

(52) U.S. Cl.
CPC ......... *H04Q 11/0067* (2013.01); *H04B 10/27* (2013.01); *H04L 12/2801* (2013.01)

(58) Field of Classification Search
CPC .. H04B 10/27; H04Q 11/0067; H04L 12/2801

USPC ........................................................ 398/66
See application file for complete search history.

(56) References Cited

U.S. PATENT DOCUMENTS

| | | | |
|---|---|---|---|
| 9,350,447 B1* | 5/2016 | Detwiler | H04B 10/272 |
| 10,033,459 B2* | 7/2018 | Pitzer | H04B 10/272 |
| 10,356,496 B2* | 7/2019 | Roe | H04Q 11/0067 |
| 10,505,499 B1 | 12/2019 | Bonen | |
| 11,539,436 B2* | 12/2022 | Krampl | H04B 10/40 |
| 2014/0105604 A1* | 4/2014 | Luo | H04L 25/085 |
| | | | 398/98 |
| 2014/0178072 A1* | 6/2014 | Yoo | H04Q 11/0067 |
| | | | 398/66 |
| 2014/0270770 A1* | 9/2014 | Lutgen | H04J 14/0221 |
| | | | 398/66 |
| 2017/0366254 A1* | 12/2017 | Gao | H04B 10/27 |
| 2020/0133370 A1 | 4/2020 | Bonen | |
| 2020/0288198 A1 | 9/2020 | Bonen | |

FOREIGN PATENT DOCUMENTS

WO 2021091839 A1 5/2021

OTHER PUBLICATIONS

International Search Report and Written Opinion RE: Application No. PCT/US2023020894, dated Sep. 25, 2023.

* cited by examiner

*Primary Examiner* — Dalzid E Singh
(74) *Attorney, Agent, or Firm* — Chernoff, Vilhauer, McClung & Stenzel, LLP

(57) ABSTRACT

An optical line terminal that includes an activation mechanism.

11 Claims, 9 Drawing Sheets

OLT POWER MANAGEMENT SYSTEM

CROSS REFERENCE TO RELATED APPLICATIONS

This application claims the benefit of U.S. patent application Ser. No. 63/338,414 filed May 4, 2022.

BACKGROUND

The subject matter of this application relates to power management for an OLT.

A passive optical network (PON) is often employed as an access network, or a portion of a larger communication network. The communication network typically has a high-capacity core portion where data or other information associated with telephone calls, digital television, and Internet communications is carried substantial distances. The core portion may have the capability to interact with other networks to complete the transmission of telephone calls, digital television, and Internet communications. In this manner, the core portion in combination with the passive optical network enables communications to and communications from subscribers (or otherwise devices associated with a subscriber, customer, business, or otherwise).

The access network of the communication network extends from the core portion of the network to individual subscribers, such as those associated with a particular residence location (e.g., business location). The access network may be wireless access, such as a cellular network, or a fixed access, such as a passive optical network or a cable network.

Referring to FIG. 1, in a PON 10, a set of optical fibers and passive interconnecting devices are used for most or all of the communications through the extent of the access network. A set of one or more optical network terminals (ONTs) 11 are devices that are typically positioned at a subscriber's residence location (e.g., or business location). The term "ONT" includes what is also referred to as an optical network unit (ONU). There may be any number of ONTs associated with a single optical splitter 12. By way of example, 32 or 64 ONTs are often associated with the single network optical splitter 12. The optical splitter 12 is interconnected with the respective ONTs 11 by a respective optical fiber 13, or otherwise a respective fiber within an optical fiber cable. Selected ONTs may be removed and/or added to the access network associated with the optical splitter 12, as desired. There may be multiple optical splitters 12 that are arranged in a cascaded arrangement.

The optical fibers 13 interconnecting the optical splitter 12 and the ONTs 11 act as access (or "drop") fibers. The optical splitter 12 is typically located in a street cabinet or other structure where one or more optical splitters 12 are located, each of which are serving their respective set of ONTs. In some cases, an ONT may service a plurality of subscribers, such as those within a multiple dwelling unit (e.g., apartment building). In this manner, the PON may be considered a point to multipoint topology in which a single optical fiber serves multiple endpoints by using passive fiber optic splitters to divide the fiber bandwidth among the endpoints.

An optical line terminal (OLT) 14 is located at the central office where it interfaces directly or indirectly with a core network 15. An interface 16 between the OLT 14 and the core network 15 may be one or more optical fibers, or any other type of communication medium. The OLT 14 forms optical signals for transmission downstream to the ONTs 11 through a feeder optical fiber 17, and receives optical signals from the ONTs 11 through the feeder optical fiber 17. The optical splitter 12 is typically a passive device that distributes the signal received from the OLT 14 to the ONTs 11. Similarly, the optical splitter 12 receives optical signals from the ONTs 11 and provides the optical signals though the feeder optical fiber 17 to the OLT 14. In this manner, the PON includes an OLT with a plurality of ONTs, which reduces the amount of fiber necessary as compared with a point-to-point architecture.

As it may be observed, an optical signal is provided to the feeder fiber 17 that includes all of the data for the ONTs 11. Accordingly, all the data being provided to each of the ONTs is provided to all the ONTs through the optical splitter 12. Each of the ONTs selects the portions of the received optical signals that are intended for that particular ONT and passes the data along to the subscriber, while discarding the remaining data. Typically, the data to the ONTs are broadcast to the feeder fiber 17 and provided to each of the ONTs.

Upstream transmissions from the ONTs 11 through the respective optical fibers 13 are typically transmitted in bursts according to a schedule provided to each ONT by the OLT. In this way, each of the ONTs 11 will transmit upstream optical data at different times. In some embodiments, the upstream and downstream transmissions are transmitted using different wavelengths of light so that they do not interfere with one another. In this manner, the PON may take advantage of wavelength-division multiplexing, using one wavelength for downstream traffic and another wavelength for upstream traffic on a single mode fiber.

The schedule from the OLT allocates upstream bandwidth to the ONTs. Since the optical distribution network is shared, the ONT upstream transmission would likely collide if they were transmitted at random times. The ONTs typically lie at varying distances from the OLT and/or the optical splitter, resulting in a different transmission delay from each ONT. The OLT measures the delay and sets a register in each ONT to equalize its delay with respect to the other ONTs associated with the OLT. Once the delays have been accounted for, the OLT transmits so-called grants in the form of grant maps to the individual ONTs. A grant map is a permission to use a defined interval of time for upstream transmission. The grant map is dynamically recalculated periodically, such as for each frame. The grant map allocates bandwidth to all the ONTs, such that each ONT receives timely bandwidth allocation for its service needs. Much of the data traffic, such as browsing websites, tends to have bursts and tends to be highly variable over time. By way of a dynamic bandwidth allocation (DBA) among the different ONTs, a PON can be oversubscribed for upstream traffic.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
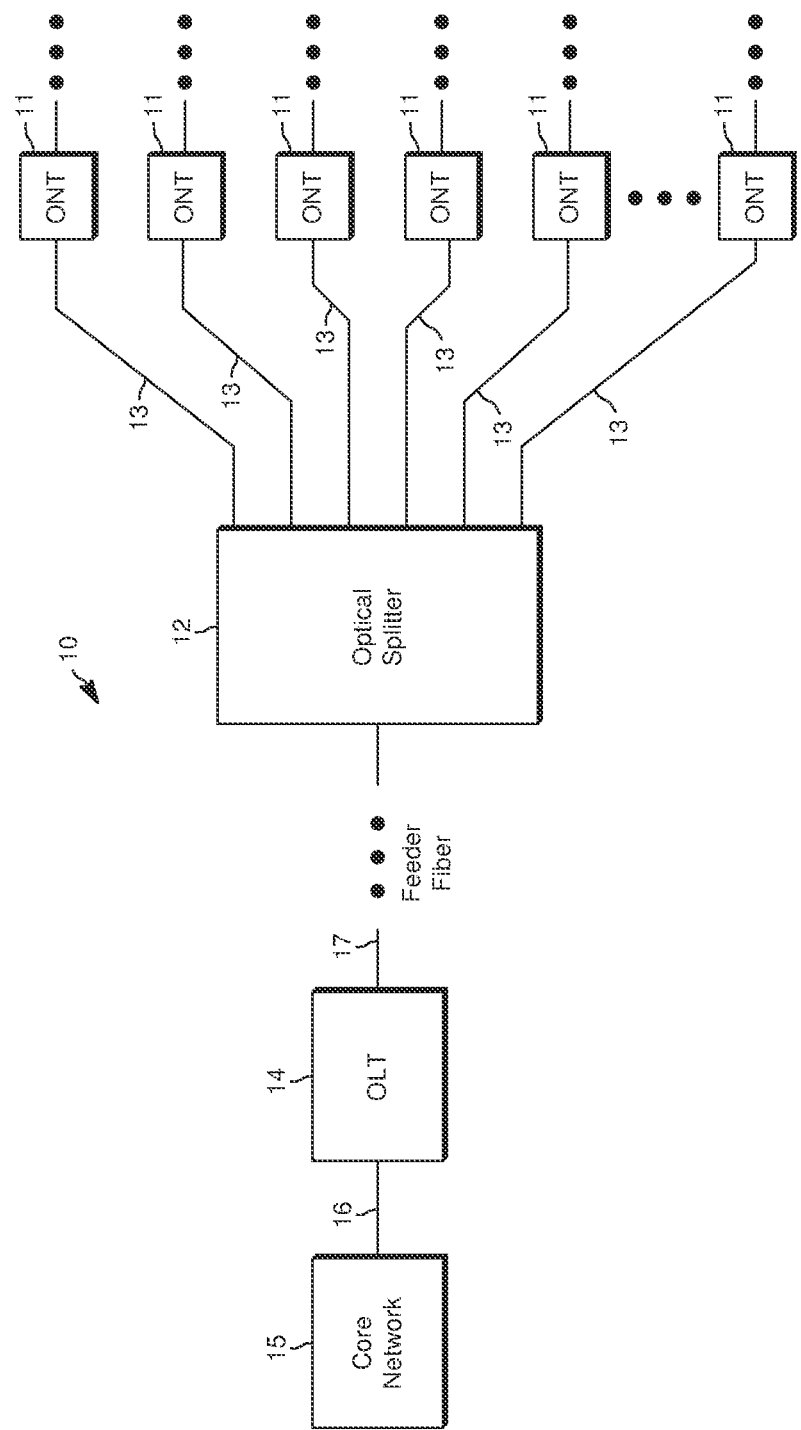
FIG. 1 illustrates a network that includes a passive optical network.
Figure 2:
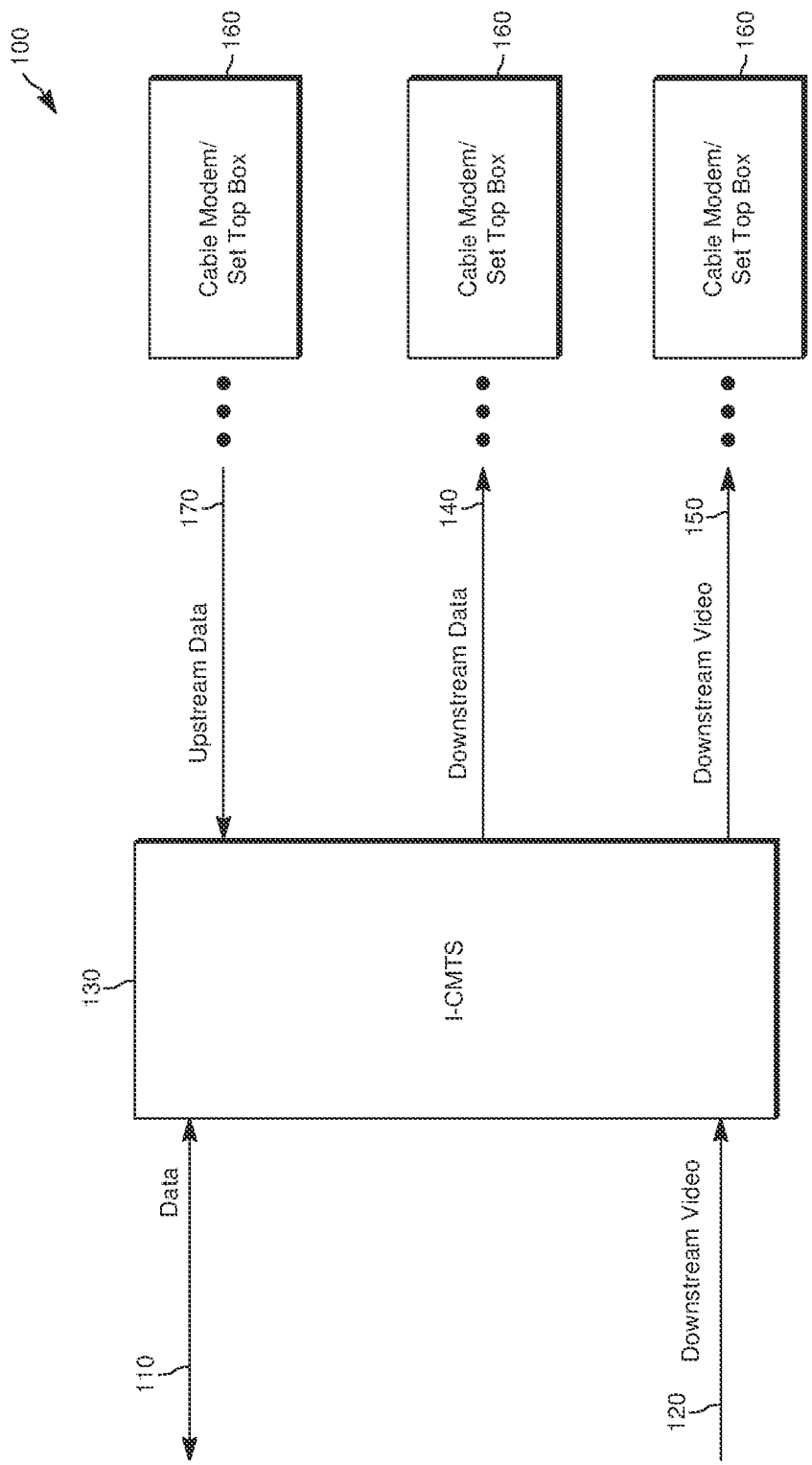
FIG. 2 illustrates an integrated video delivery and Cable Modem Termination System.

Referring to FIG. 2, an integrated CMTS (e.g., Integrated Converged Cable Access Platform (CCAP)) 100 may include data 110 that is sent and received over the Internet (or other network) typically in the form of packetized data. The integrated CMTS 100 may also receive downstream video 120, typically in the form of packetized data from an operator video aggregation system. By way of example, broadcast video is typically obtained from a satellite delivery system and pre-processed for delivery to the subscriber though the CCAP or video headend system. The integrated CMTS 100 receives and processes the received data 110 and downstream video 120. The CMTS 130 may transmit downstream data 140 and downstream video 150 to a customer's cable modem and/or set top box 160 through a RF distribution network, which may include other devices, such as amplifiers and splitters. The CMTS 130 may receive upstream data 170 from a customer's cable modem and/or set top box 160 through a network, which may include other devices, such as amplifiers and splitters. The CMTS 130 may include multiple devices to achieve its desired capabilities. It is noted that the data and video for different cable modem and/or set top box are typically transmitted on a single cable until a split occurs. Also, for the CMTS, there is typically a video source in parallel, such as an EdgeQAM.

Figure 3:
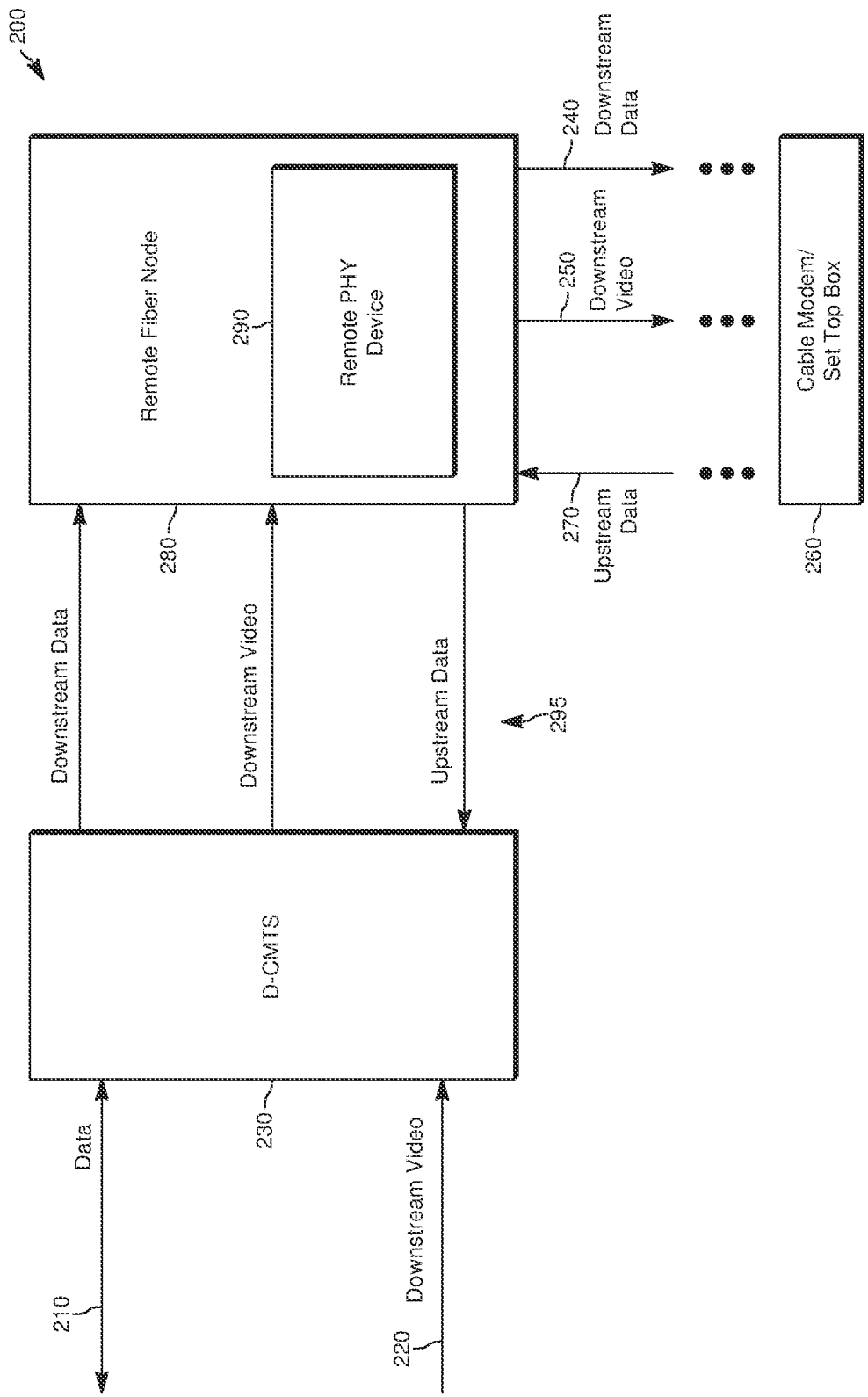
FIG. 3 illustrates a distributed video delivery and Cable Modem Termination System.

Referring to FIG. 3, as a result of increasing bandwidth demands, limited facility space for integrated CMTSs, and power consumption considerations, it is desirable to include a Distributed Cable Modem Termination System (D-CMTS) 200 (e.g., Distributed Converged Cable Access Platform (CCAP)). CableLabs specifications refer to this architecture as a Distributed CCAP Architecture (DCA) in the Flexible MAC Architecture (FMA) specifications. In general, the CMTS is focused on data services while the CCAP further includes broadcast video services. The D-CMTS 200 distributes a portion of the functionality of the I-CMTS 100 downstream to a remote location, such as a fiber node, using network packetized data. An exemplary D-CMTS 200 may include a remote PHY architecture, where a remote PHY (R-PHY) is preferably an optical node device that is located at the junction of the fiber and the coaxial. In general the R-PHY often includes the PHY layers of a portion of the system. The D-CMTS 200 may include a D-CMTS 230 (e.g., core) that includes data 210 that is sent and received over the Internet (or other network) typically in the form of packetized data. The D-CMTS 230 is referred to as the Remote MAC Core (RMC) in the Flexible MAC Architecture (FMA) CableLabs specifications. The D-CMTS 200 may also receive downstream video 220, typically in the form of packetized data from an operator video aggregation system. The D-CMTS 230 receives and processes the received data 210 and downstream video 220. A remote fiber node 280 preferably include a remote PHY device (RPD) 290. The RPD 290 may transmit downstream data 240 and downstream video 250 to a customer's cable modem and/or set top box 260 through a network, which may include other devices, such as amplifier and splitters. The RPD 290 may receive upstream data 270 from a customer's cable modem and/or set top box 260 through a network, which may include other devices, such as amplifiers and splitters. The RPD 290 may include multiple devices to achieve its desired capabilities. The RPD 290 primarily includes PHY related circuitry, such as downstream QAM modulators, upstream QAM demodulators, together with pseudowire logic to connect to the D-CMTS 230 using network packetized data. The RPD 290 and the D-CMTS 230 may include data and/or video interconnections, such as downstream data, downstream video, and upstream data 295. It is noted that, in some embodiments, video traffic may go directly to the RPD thereby bypassing the D-CMTS 230. In some cases, the remote PHY and/or remote MACPHY functionality may be provided at the head end. Also, for the CMTS, there is typically a video source in parallel, such as an EdgeQAM.

By way of example, the RPD 290 may covert downstream DOCSIS (i.e., Data Over Cable Service Interface Specification) data (e.g., DOCSIS 1.0; 1.1; 2.0; 3.0; 3.1; and 4.0 each of which are incorporated herein by reference in their entirety), video data, out of band signals received from the D-CMTS 230 to analog for transmission over RF or analog optics. By way of example, the RPD 290 may convert upstream DOCSIS, and out of band signals received from an analog medium, such as RF or linear optics, to digital for transmission to the D-CMTS 230. As it may be observed, depending on the particular configuration, the R-PHY may move all or a portion of the DOCSIS MAC and/or PHY layers down to the fiber node.

The amount of data services supported by DOCSIS based networks over time has been increasing. To support the ever-increasing data capacity needs, the DOCSIS standard has likewise been evolving in a manner to support the increasing data capacity needs. A single-carrier quadrature amplitude modulation (SC-QAM) based transmission of DOCSIS 3.0 is giving way to orthogonal frequency division multiplexing (OFDM) and orthogonal frequency division multiple access (OFDMA) of DOCSIS 3.1, to support greater megabits per second (Mbps) per mega-hertz (MHz) of spectrum. Furthermore, more MHz of radio frequency (RF) spectrum yields more Mbps, thus a wider spectrum, for both downstream (DS) and upstream (US) transmission is another manner in which the DOCSIS standard has evolved. For example, the DOCSIS standard has evolved from (1) 5-85 MHz US with 102-1002 MHz DS supported by DOCSIS 3.0 to (2) 5-204 MHz US with 258-1218 MHz DS of DOCSIS 3.1, and (3) 5-684 MHz US with 54-1794 MHz DS of DOCSIS 4.0. Transmitted spectrum width increase, in DS especially, affects how the network is architected. The DOCSIS 3.1 to DOCSIS 4.0 transition, from 1,218 MHz highest DS frequency to 1,794 MHz highest DS frequency, envisions a change from a centralized access architecture (CAA) to distributed access architecture (DAA), in order to support higher OFDM modulation formats and thus improved spectral density at the DAA nodes.

Nodes are hybrid fiber coax (HFC) devices in which the fiber links (or otherwise) transition to the coaxial cables, and as such nodes convert optical signals (or otherwise) into the RF signals and/or convert RF signals (or otherwise) to optical signals. Also, the nodes condition RF signals for transmission over coaxial cables, for an eventual delivery to subscribers, situated at the other end of the coaxial portion of the HFC network. The node may be configured based upon the environment, such as for example, a strand, an underground vault, or a street cabinet. The node may be configured with any suitable number of ports, such as one, two, three, four, or more, coaxial ports.

Often the nodes (e.g., vault, street cabinet, or otherwise), depending on the configuration of the networks serving the subscribers, may include portions of the HFC network and portions of the PON network. For example, the portions of the HFC network maintained within the nodes may include passive components, powered analog components, and/or powered digital components (e.g., RPD/RMD). For example, the portions of the PON network maintained within the nodes may include passive components, powered analog components, and/or powered digital components (e.g., remote OLTs). Typically, each of the nodes may receive power to operate the active components within the node from a remote source, such as through the cables providing data services to the nodes. Further, multiple nodes may receive power to operate the active components within the node from the same remote power source, such as through respective cables providing data services to the nodes. Different components, especially the active analog components are generally not sensitive to temporary fluctuations in the power being provided them. However, the active digital components may be sensitive to temporary fluctuations in the power being provided to them. By way of example, sufficient temporary power fluctuation to the power being provided to a RMD and/or a RPD may result in loosing connectivity to all of its respective subscribers. The RMD and/or RPD then is restarted together with all of its digital services, which then reconnects to each of its respective subscribers, which can take a considerable length of time. By way of example, sufficient temporary power fluctuation to the power being provided to a remote OLT may result in loosing connectivity to all of its respective subscribers. The OLT then is restarted together with all of its digital services, which then reconnects to each of its respective subscribers, which can take a considerable length of time. The power fluctuations may result from a variety of different sources, such as for example, switching out components within the node, repairing components within the node, modifying components within the network such as splicing a cable, power outages from the power source, switching/repairing/modifying HFC components impacting the PON components, switching/repairing/modifying PON components impacting the HFC components, and/or otherwise. Also, with multiple OLTs being supplied power by the same power source, may result in power interruptions when the OLTs are added, removed, or exchanged from the group of OLTs. Accordingly, there are numerous sources within a PON network and its associated components that may result in fluctuations in the power that may result in a restarting of one or more OLTs. Further, software (e.g., firmware) upgrades for the OLT may likewise result the restarting of the OLT and disconnecting services to its subscribers in the process.

Figure 4:
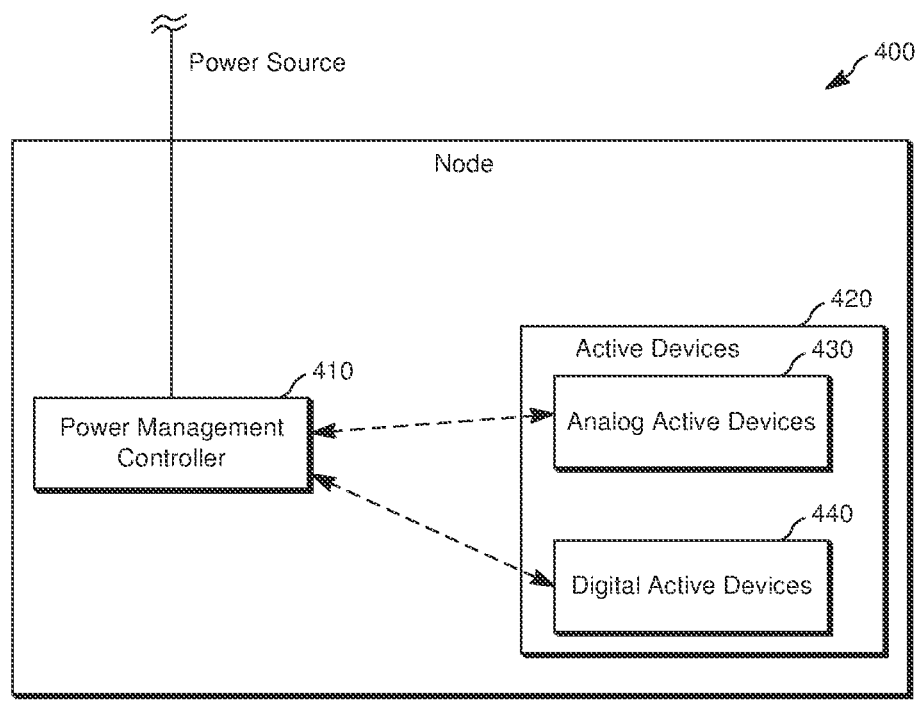
FIG. 4 illustrates a node with a power management controller.

Referring to FIG. 4, a node 400 may include a power management controller 410. The signalling cables are not shown. The power management controller 410 receives power from the same source(s) as the other components within the node 400, which may be separate power cables or otherwise together with the signalling. The power management controller 410 may communicate with each of the active devices 420, which may include analog active devices 430 and digital active devices 440. The power management controller 410 manages the usage of power by the devices of the node and manages the timing of when the devices of the node are powered up which tends to temporarily increase the load on the power source than the subsequent steady state operation. The power management controller 410 preferably discriminates between at least two different types of power usage, namely, a first type of power usage for the active analog components which tend to be generally insensitive to power fluctuations and a second type of power usage for the active digital components which tends to be generally sensitive to power fluctuations. The power management controller 410 may permit greater fluctuations in the power levels when the result of the power fluctuations results in the active analog components being reset or otherwise temporary not providing service to their respective subscribers. The power management controller 410 may inhibit greater fluctuations in the power levels when the result of the power fluctuations results in the active digital components being reset or otherwise temporary not providing service to their respective subscribers. In this manner, the power management controller 410 may manage the power usage of the devices within the node to provide an increased likelihood that a subscriber will not lose service or otherwise the service interruption will be reduced.

The activation process describes the steps in which an inactive ONT connects or reconnects to a PON. The activation process generally includes three phases, namely, (1) parameter learning, (2) serial number acquisition, and (3) ranging. During the learning parameter phase, the ONT acquires the operational parameters used for the upstream transmission. During the serial number acquisition phase, OLT discovers a new ONT (by serial number) and assigns an ONT identifier (ONU-ID) to it.

The ONT round trip delay (RTD) is the time interval between the downstream frame transmission and the corresponding upstream transmission burst from the given ONT. The RTD consists of a propagation delay that is directly proportional to the length of the fibers from the ONT and the response of the ONT. To ensure that transmission bursts from different ONTs are ordered at the interface of the same upstream GPON transmission convergence layer (GTC) frame, the delay time is assigned to each ONT to postpone the transfer of the upstream burst to the time not used for a common response time. This response time is called the equalization delay (EqD), and for each given ONT, the OLT is calculated based on the RTD measurement and consequently transmitted during the ranging state.

To avoid collisions with the upstream bursts transmitted during acquisition of the serial number and the range of the newly-connected ONT, the OLT must temporarily suppress the upstream transmission of the active ONT for the time that the arrival of upstream bursts from the new ONT is assumed. This time interval is referred to as the quiet window.

The activation process is performed under the control of the OLT by means of exchange of upstream and downstream PLOAM messages. The outline of activation process events in their causal order is as follows, where the ONU and ONT are equivalent for purposes of this discussion:

(1) The ONT entering the activation process listens to the downstream transmission and attains PSync and superframe synchronization.

(2) The ONT waits for the Upstream_Overhead PLOAM message, optionally followed by the Extended_Burst_Length PLOAM message periodically issued by the OLT.

(3) The ONT receives the PON operating parameters (the lengths and patterns of the burst mode overhead components, value of the pre-assigned delay, and initial optical power level) through the Upstream_Overhead and Extended_Burst_Length messages.

(4) The ONT announces its presence on the PON by responding to a broadcast serial number request periodically issued by the OLT with a Serial_Number_ONU message.

(5) The ONT adjusts its transmission optical power level using the absence of directed messages from the OLT as a negative acknowledgment.

(6) The OLT discovers the serial number of a newly connected ONT and assigns an ONU-ID to it using the Assign_ONU-ID message.

(7) The OLT issues a directed serial number request to a newly discovered ONT and accurately times the ONT's response.

(8) The OLT computes the individual equalization delay and communicates this equalization delay to the ONT using the Ranging_Time message.

(9) The ONT adjusts the start of its upstream GTC frame clock based on its assigned equalization delay.

(10) The ONT completes activation and start regular operation.

In the normal Operation state, the OLT monitors the phase and BER of the arriving upstream transmissions. Based on the monitored phase information, the OLT may re-compute and dynamically update the equalization delay for any ONT. Based on the monitored BER information, the OLT may instruct an ONT to dynamically adjust its optical power level.

Figure 5:
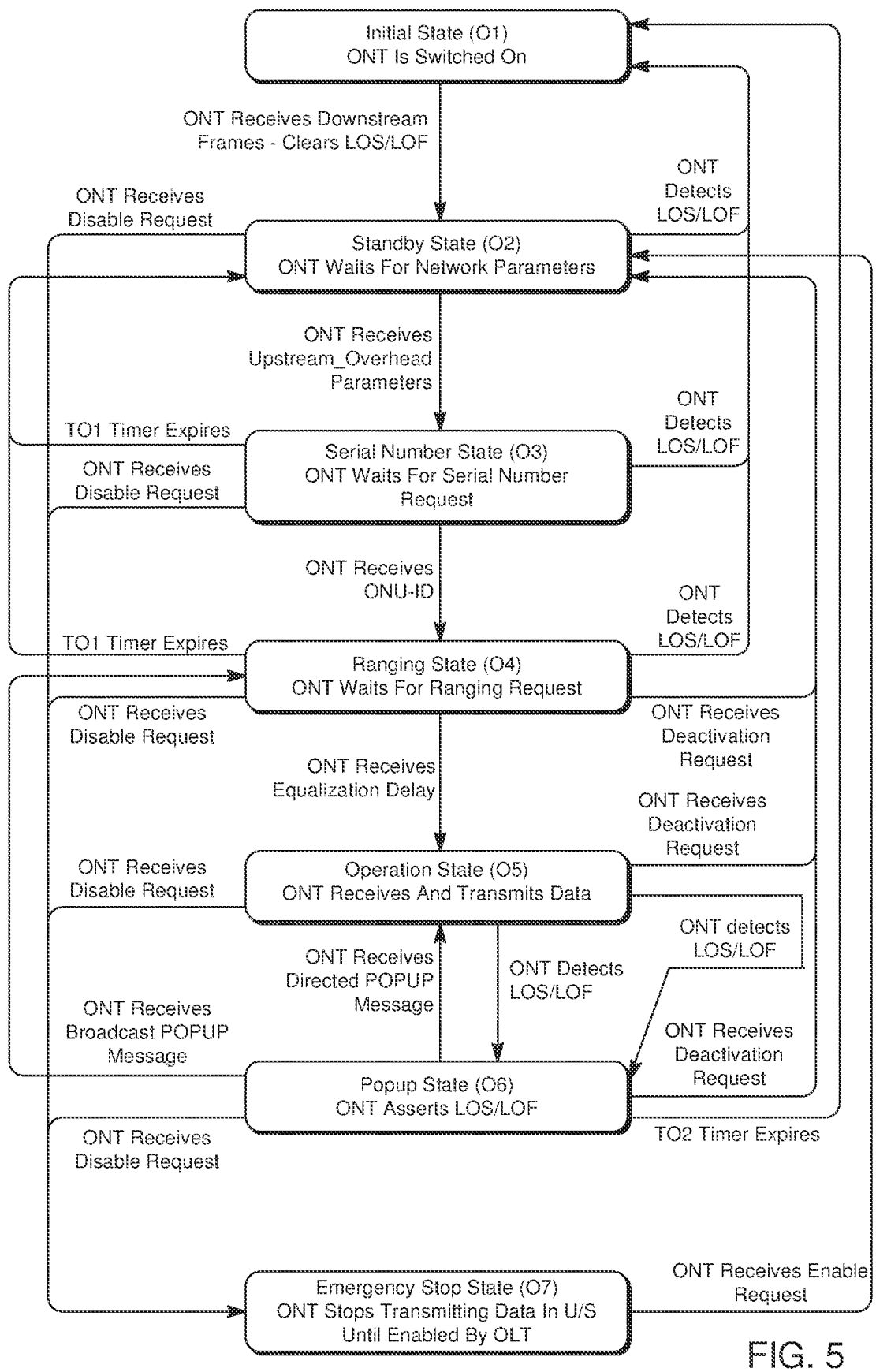
FIG. 5 illustrates an activation mechanism.

Referring to FIG. 5, the activation mechanism of the ONT may include 7 defined states.

Initial state (O1). The ONT powers up in this state. LOS/LOF is asserted. Once downstream traffic is received, LOS and LOF are cleared, the ONT moves to the Standby state (O2).

Standby state (O2). Downstream traffic is received by the ONT. The ONT waits for global network parameters. Once the Upstream_Overhead message is received, the ONT configures these parameters (e.g., delimiter value, power level mode and pre-assigned delay) and moves to the Serial Number state (O3).

Serial_Number state (O3). By responding to the serial number requests sent out by the OLT, the ONT makes itself known to the OLT and allows the OLT to discover the ONT's serial number. Once the ONT has responded to a serial number request, it waits for the unique ONT-ID assignment from the OLT. The ONT-ID is assigned using the Assign_ONU-ID message. Once assigned, the ONT moves to the Ranging state (O4).

The OLT may, at its discretion, use the Extended_Burst_Length message to communicate the extended overhead parameters to all the ONTs on the PON. If the ONT in Serial_Number state (O3) receives the Extended_Burst_Length message prior to receiving any serial number requests, it configures the type 3 preamble lengths according to the received values.

Ranging state (O4). The upstream transmission from the different ONTs must be synchronized with the upstream GTC frame boundaries. In order to make the ONTs appear to be at an equal distance from the OLT, an equalization delay per ONT is required. This equalization delay is measured when the ONT is in the Ranging state. Once the ONT receives the Ranging_Time message, it moves to the Operation state (O5).

Operation state (O5). Once in this state, the ONT can send upstream data and PLOAM messages as directed by the OLT. Additional connections can be established with the ONT as required while in this state. Once the network is ranged, and all the ONTs are working with their correct equalization delay, all upstream bursts will be synchronized together between all the ONTs. The upstream transmissions will arrive separately, each one in its correct location within the upstream GTC frame.

POPUP state (O6). The ONT enters this state from the Operation state (O5) following the detection of LOS or LOF alarms. When entering the POPUP state (O6), the ONT immediately stops upstream transmission. As a result, the OLT will detect an LOS alarm for that ONT.

Once in the POPUP state, the ONT first attempts to reacquire optical signal and restore GTC frame synchronization, thus clearing LOS and LOF conditions. Once successful, the ONT begins processing PCBd field of the downstream GTC frames and restarts the superframe synchronization state machine. Note that in case of Type B protection, the signal may be coming either from the backup OLT or from the primary OLT.

While in the POPUP state, the ONT generates a PLOAM message receive event only in response to Disable_ONU-ID, Deactivate_Serial_Number and POPUP messages. If ONT receives a directed POPUP message, it transitions to the Operation state (O5). If the ONT receives a broadcast POPUP message, it transitions to the Ranging state (O4).

Once the ONT is in the Operation state (O5), the OLT can test the ONT before returning it to full service. In particular, an encryption key switch event may have been scheduled while in the POPUP state (O6). To ensure graceful recovery in such a situation, the OLT should restart the key exchange and switch-over procedure with the ONT.

If the ONT is not able to reacquire optical signal or restore GTC frame synchronization, it will not receive the POPUP message (broadcast or directed) and will move to the Initial state (O1), following time-out (TO2).

Emergency Stop state (O7). An ONT that receives a Disable_Serial_Number message with the 'disable' option moves to the emergency stop state (O7) and shuts its laser off. During emergency stop, the ONT is prohibited from sending data in the upstream direction.

If the ONT fails to move to the Emergency Stop state, that is, after the Disable_Serial_Number message has been sent three times, the OLT continues to receive the ONT transmissions in the provided upstream bandwidth allocations, a DFi alarm is asserted in the OLT.

When the deactivated ONT's malfunction is fixed, the OLT may activate the ONT in order to bring it back to working condition. The activation is achieved by sending a Disable_Serial_Number message with the 'enable' option to the ONT. As a result, the ONT returns to Standby state (O2). All parameters (including serial number and ONU-ID) are re-examined. International Telecommunication Union. G.984.3: Gigabit-Capable Passive Optical Networks (G-PON): Transmission Convergence Layer Specification, incorporated by reference herein in its entirety.

The principles of the activation process for XG-PON are similar to those for GPON described above. International Telecommunication Union. G.987.3: 10-Gigabit-Capable Passive Optical Networks (XG-PON): Transmission Convergence (TC) Layer Specification, incorporated by reference herein in its entirety.

Figure 6:
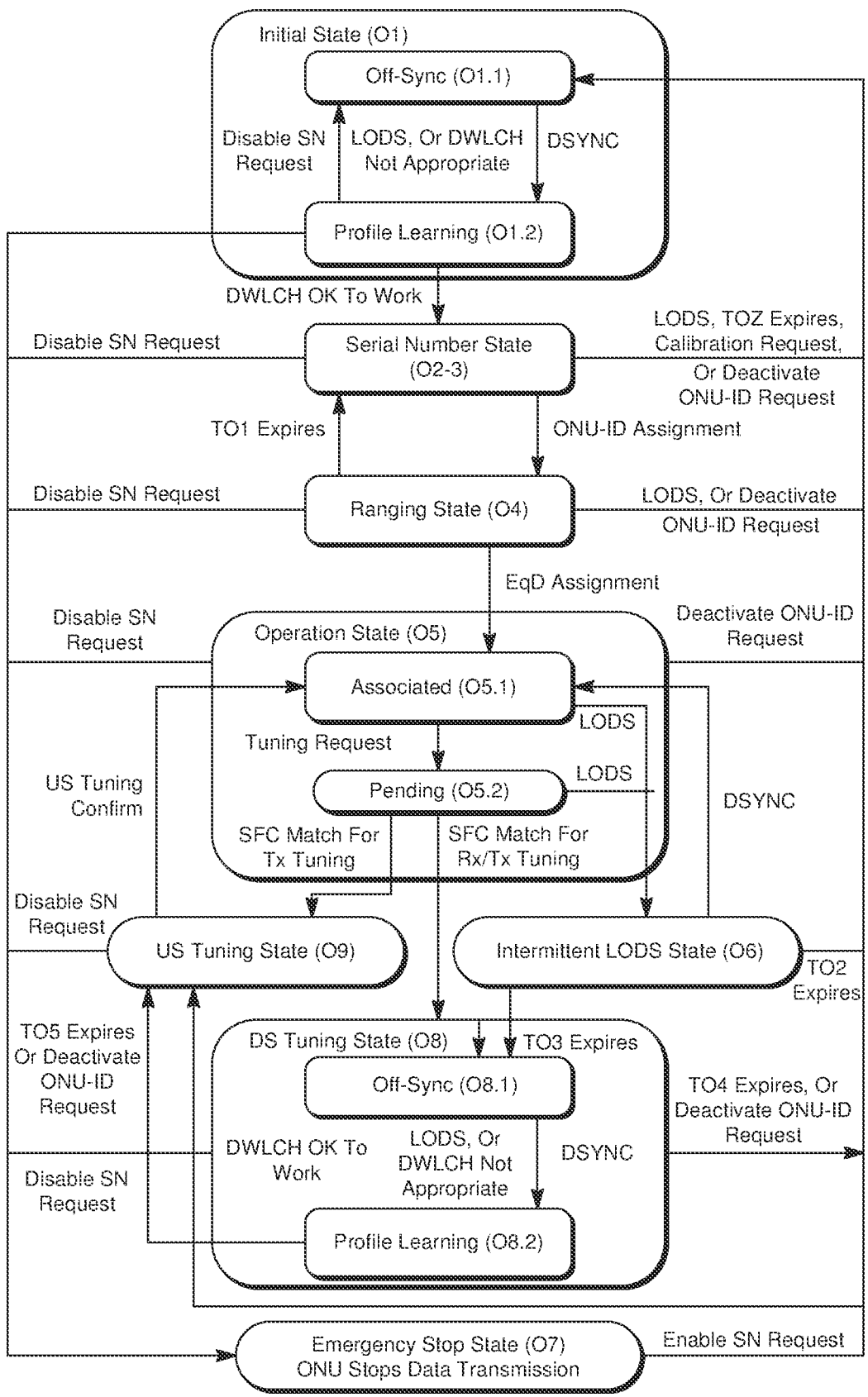
FIG. 6 illustrates an activation mechanism.

Referring to FIG. 6, the principles of the activation process for NG-PON2 are generally similar to those for GPON described above. The activation process is provided by time and wavelength division multiplexing transmission convergence (TWDM-TC). In the NG-PON2 standard, there are two options for the PLOAM channel. The in-band option is a PLOAM message transmission, and the auxiliary management and control channel (AMCC) option is mandatory for ONTs that do not meet the specified calibration limits for a given upstream wavelength channel.

In any event, it may be observed that there is a substantial amount of data exchanged between the OLT and the ONT that exchanges the configuration information for such a data exchange. The relevant aspects of the resulting data are maintained during a session by the OLT and the ONT to facilitate the exchange of data on the PON network.

Figure 7:
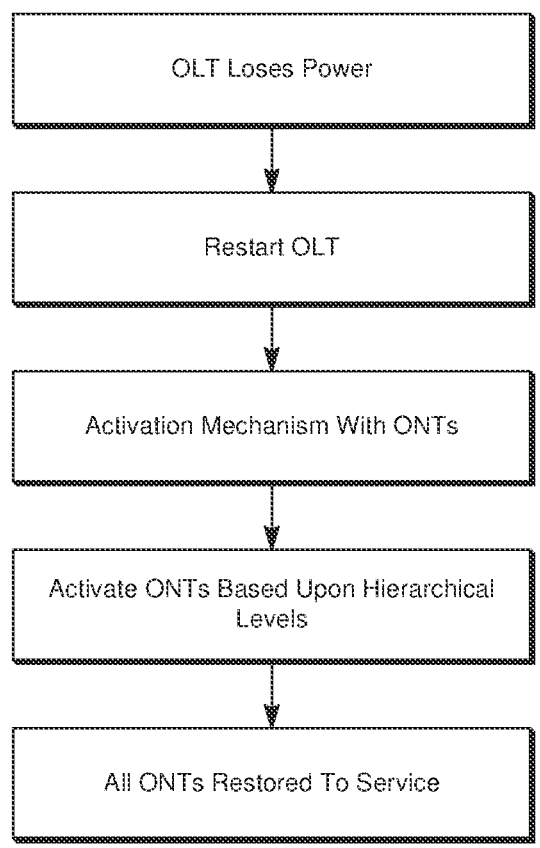
FIG. 7 illustrates OLT restarting and activation of ONTs.

Referring to FIG. 7, in the event that the OLT loses power it will need to go through an activation mechanism between the OLT and the various ONTs. The activation process, in addition to restarting the OLT itself, takes a substantial amount of time. With a large number of ONTs being supported by the same OLT, it may take substantial time until all of the ONTs complete their respective activation process. The time for each particular ONT to complete the activation mechanism varies substantially from one ONT to another ONT depending upon a variety of different factors. Each of the ONTs preferably includes a hierarchical level of priority with respect to the other ONTs. These hierarchical levels may be maintained by the OLT. Alternatively, these hierarchical levels may be maintained by an associated OLT manager, typically in the form a server accessible by the OLT through the network. The hierarchical levels may be associated with each of the ONTs, such as a priority level from 1 to 10, or may be based upon a service level (such as based upon the service level agreement), or otherwise. In response to restarting the OLT or otherwise starting the OLT, the OLT preferably prioritizes the activation of higher hierarchical levels in some manner with respect to lower hierarchical levels. Accordingly, on average the higher hierarchical levels will be activated, or otherwise attempt to start their activation process, prior to on average the lower hierarchical levels. In this manner, those with higher service level agreements, or otherwise, will tend to have their service restarted in a more timely manner.

Figure 8:
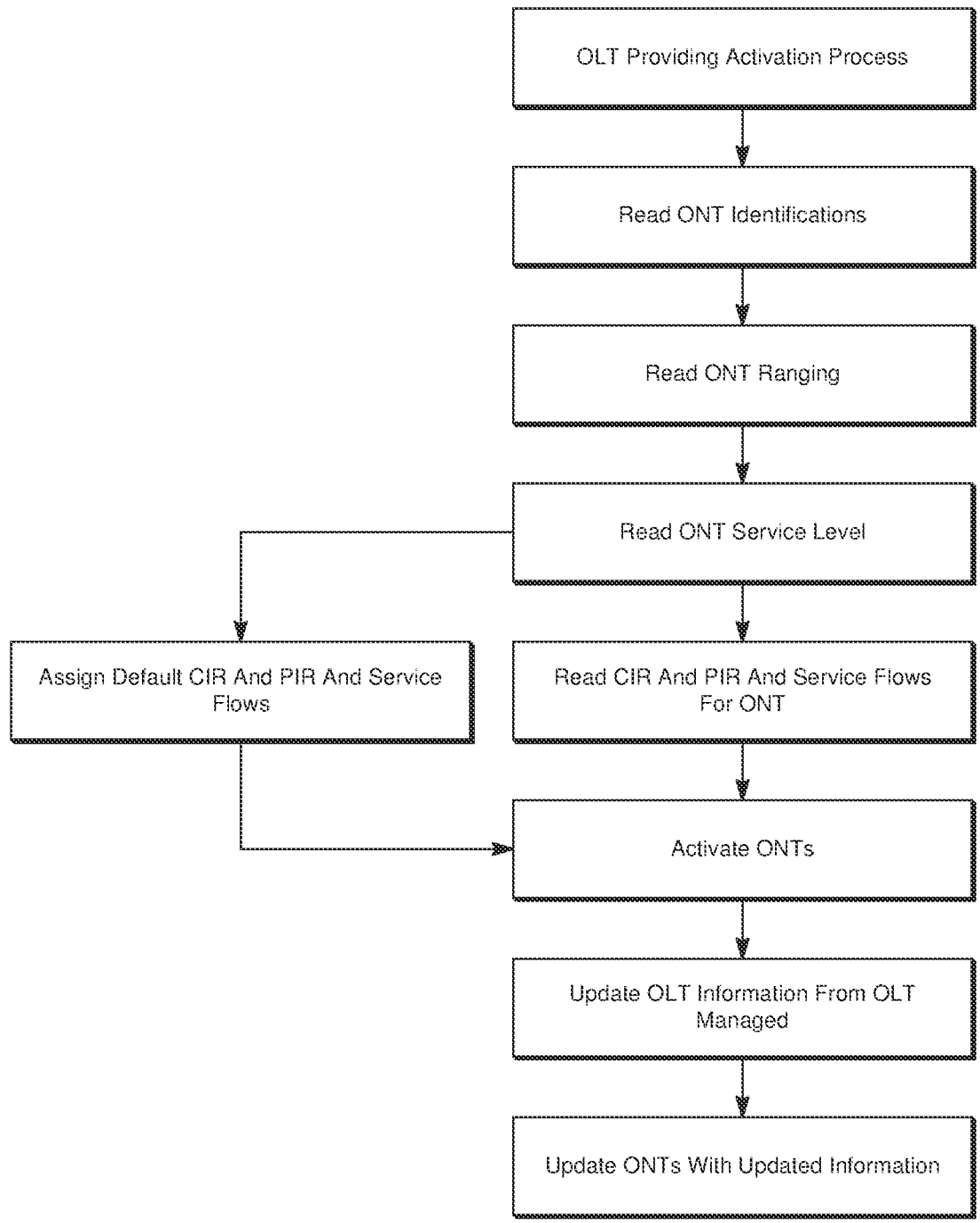
FIG. 8 illustrates OLT restarting and activation of ONTs.

Referring to FIG. 8, while the OLT may go through the activation process to discover the existence of ONTs, discover information related to each ONT including its identification (i.e., ID), perform ranging for each of the ONTs, determine the service level associated with each ONT through a request to an OLT manager maintaining such ID information and service level information for each of the ONTs, it all requires a substantial time and computational resources. In most situations, the OLT restarting results in a temporary service outage where the configuration of the network and/or the selection and configuration of the ONTs has not substantially changed. With the generally static configuration nature of the physical PON network, the OLT, and the ONTs, the OLT preferably maintains an internal data structure containing the principal information that is normally identified or otherwise determined during the activation process. Further, the OLT preferably maintains this internal data structure on a non-volatile storage device, such as a hard drive, non-volatile memory, or otherwise, so that the information is not lost as a result of a loss of power to the OLT. Furthermore, even if this information is available from a corresponding OLT manager operating on a server, such a connection may not always be available and otherwise the ability to obtain such information from a connected OLT manger may take a considerable amount of time. As a result of restarting of the OLT, the OLT obtains the data from the maintained internal data structure to preconfigure many of the connections with the ONTs. If a committed information rate (CIR), peak information rate (PIR), service flows, or otherwise are not available from the OLT manager or otherwise not maintained by the OLT, the OLT may assign a default value for each ONT so that it may regain at least some service, which may be updated later. For example, the OLT does not need to rediscover the ID associated with the respective ONT. For example, the OLT does not need to redetermine the service level associated with the respective ONT. For example, the OLT does not need to redetermine the ranging information associated with the respective ONT. For example, the OLT does not need to redetermine the peak information rate associated with the respective ONT. For example, the OLT does not need to redetermine the committed information rate associated with the respective ONT. By already having this information available, the OLT may substantially decrease the time for the activation process to complete. Further, after the activation process is completed or partially completed, the OLT may obtain suitable configuration information from the OLT manager, which is then compared against the existing state of the OLT and ONTs. The OLT then may selectively update portions of the configuration, such as for example, the service level agreement of particular ONTs.

Figure 9:
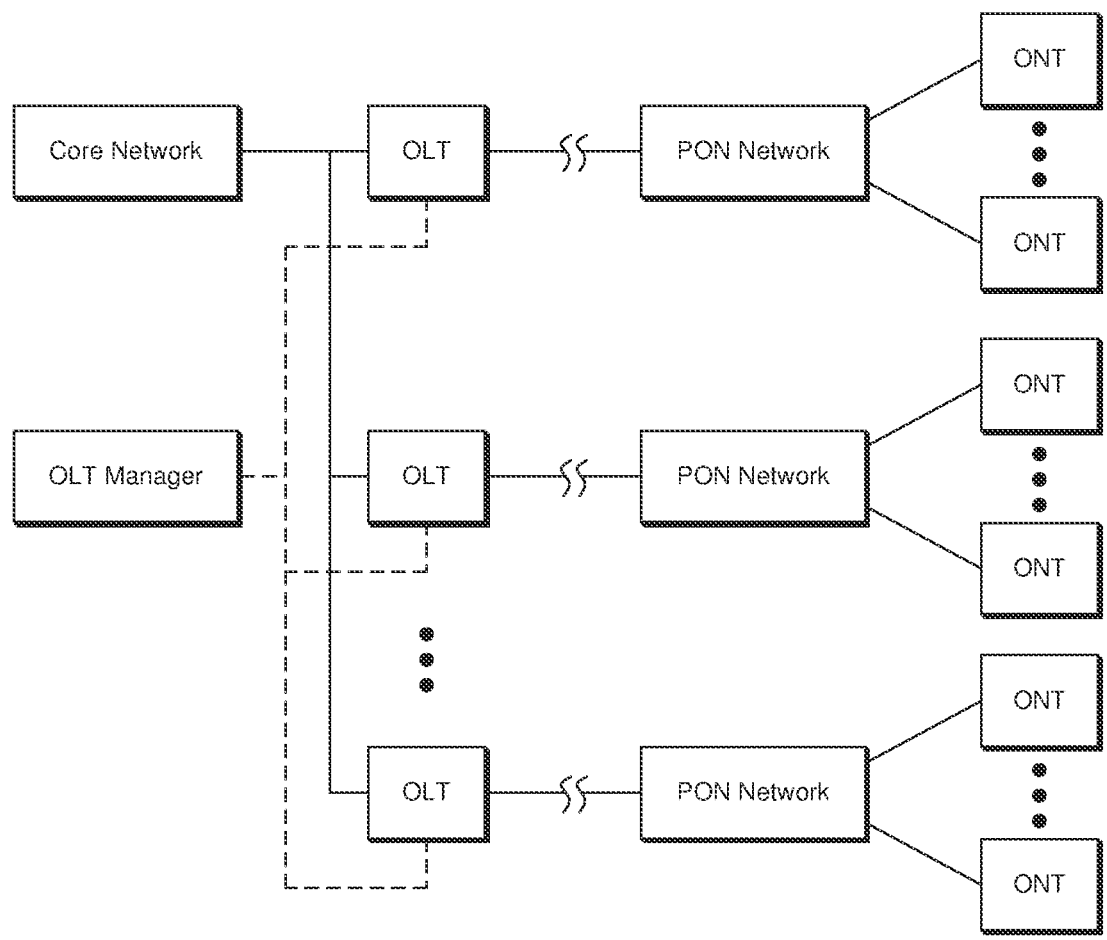
FIG. 9 illustrates an OLT manager and a PON network.
Figure 10:
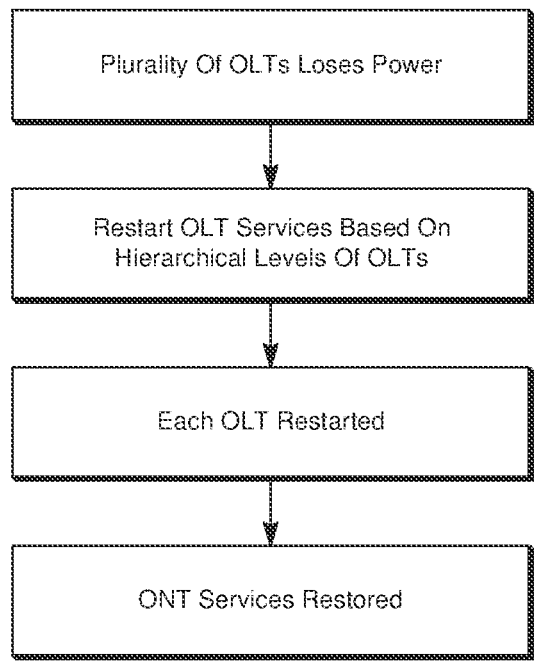
FIG. 10 illustrates restarting a plurality of OLTs.

Referring to FIG. 9 and FIG. 10, as it may be observed, in some configurations the core network and the OLT manager which is typically operating on a server, are each interconnected with one or more OLTs which are each in turn interconnected to a respective set of ONTs. While an OLT is resetting as a result of some event, there may be situations where the OLT manager is not available, in which case the OLT maintains sufficient information to perform the activation process for previously activated ONTs, in addition to activating one or more ONTs that were not previously associated with the OLT. However, there are multiple OLTs that are simultaneously restarted, often as a result sharing the same power source, an orderly restarting of the OLTs is desirable with the interconnection with the OLT manager and/or core network. Each of the OLTs may have a hierarchical level, such that one OLT that services high service levels should be restarted in a manner providing priority to it over other OLTs that have lower service levels.

Moreover, each functional block or various features in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. An optical line terminal comprising:
   (a) said optical line terminal capable of receiving digital data from a core network and in response provide optical digital data to a plurality of optical network terminals;
   (b) said optical line terminal configured to process an activation mechanism between said optical line terminal and said optical network terminals to activate said optical network terminals;
   (c) said optical line terminal in response to restarting said optical line terminal activating each of said optical network terminals based upon hierarchical levels of priority.

2. The optical line terminal of claim 1 comprising said hierarchical levels of priority for said optical network terminals being maintained by said optical line terminal during said restarting.

3. The optical line terminal of claim 1 comprising said hierarchical levels of priority for said optical network terminals received from an optical line terminal manager operating on a computer separate from said optical line terminal.

4. The optical line terminal of claim 1 comprising said hierarchical levels of priority for said optical network terminals based upon a service level.

5. An optical line terminal comprising:
   (a) said optical line terminal capable of receiving digital data from a core network and in response provide optical digital data to a plurality of optical network terminals;
   (b) said optical line terminal configured to process an activation mechanism between said optical line terminal and said optical network terminals to activate said optical network terminals;
   (c) said optical line terminal in response to restarting said optical line terminal activating each of said optical network terminals based upon state information maintained by said optical line terminal during said restarting.

6. The optical line terminal of claim 5 wherein said state information includes a respective ID for each of the optical network terminals.

7. The optical line terminal of claim 5 wherein said state information includes respective ranging information for each of the optical network terminals.

8. The optical line terminal of claim 5 wherein said state information includes respective service level for each of the optical network terminals.

9. The optical line terminal of claim 5 wherein said state information includes at least one of a respective committed information rate and peak information rate for each of the optical network terminals.

10. The optical line terminal of claim 5 wherein an additional optical network terminal not previously activated by said optical line terminal prior to said restarting is activated by said optical line terminal not based upon said state information nor information received from another device other than said optical network terminal and said optical line terminal.

11. A plurality of optical line terminals comprising:
    (a) said optical line terminals capable of receiving digital data from a core network and in response provide optical digital data to a plurality of respective optical network terminals;
    (b) said optical line terminals configured to process an activation mechanism between said optical line terminal and respective said optical network terminals to activate said optical network terminals;
    (c) a set of said optical line terminals in response to simultaneously restarting said set of optical line terminals delaying at least a part of its respective activation process based upon hierarchical levels of priority of said set of said optical line terminals.

* * * * *